Figure 1:
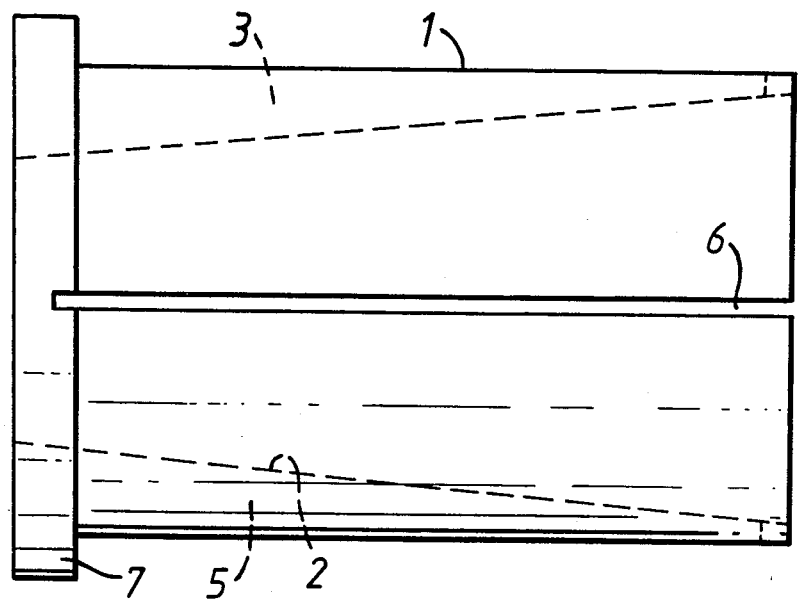

United States Patent [19]

Ashcombe et al.

[11] Patent Number: 4,569,114
[45] Date of Patent: Feb. 11, 1986

[54] ENERGY STORAGE FLYWHEELS AND METHOD OF MOUNTING

[75] Inventors: Geoffrey T. Ashcombe, Thames Ditton; Ian Duff-Barclay, Maidenhead; Clive Morant, Basingstoke, all of England

[73] Assignee: The British Petroleum Company p.l.c., London, England

[21] Appl. No.: 652,966

[22] Filed: Sep. 21, 1984

[30] Foreign Application Priority Data

Sep. 23, 1983 [GB] United Kingdom ............... 8325602

[51] Int. Cl.⁴ .................. B23P 19/02; B23P 11/02
[52] U.S. Cl. ............................ 29/525; 29/446
[58] Field of Search ..................... 29/446, 525, 526

[56] References Cited

U.S. PATENT DOCUMENTS 4,048,898 9/1977 Salter ................................ 29/446

Primary Examiner—Mark Rosenbaum
Assistant Examiner—Steven Nichols
Attorney, Agent, or Firm—Morgan, Finnegan, Pine, Foley & Lee

[57] ABSTRACT

A method of mounting a fibre composite flywheel on a relatively stiff shaft, such as a metal or carbon fibre shaft, comprising passing the shaft through a hole in a hub at the center of the flywheel and securing the flywheel to the shaft wherein the shaft has a tapered portion and a deformable sleeve is positioned between the shaft and the hub of the flywheel on assembly. The deformable sleeve comprises a hollow cylinder having a tapered bore which corresponds to the tapered portion of the shaft and having an outside diameter which, before deformation, is larger than the diameter of the hole in the hub of the flywheel by an amount which is greater than the theoretical amount of radial growth which the hole in the hub would experience at the maximum operating speed of the flywheel. On assembly, the deformable sleeve is deformed such that it will fit in the hole in the hub of the flywheel and the deformable sleeve is driven along the tapered portion of the shaft thereby forcing the deformable sleeve towards its undeformed shape and subjecting the hub of the flywheel to compressive forces.

5 Claims, 2 Drawing Figures

U.S. Patent  Feb. 11, 1986  4,569,114

ENERGY STORAGE FLYWHEELS AND METHOD OF MOUNTING

This invention relates to a method of mounting an energy storage flywheel on a rotatable shaft and in particular to a method of mounting a fibre composite flywheel on a relatively stiff shaft.

The ability of flywheels to accept and discharge energy over relatively short periods of time has been known for many years and energy storage flywheels have been used, or proposed for use, in a variety of applications. One application which has received increasing attention in recent years is the use of a flywheel as a means of storing kinetic energy in motor vehicles.

The amount of energy stored in a flywheel is dependent upon the mass of the flywheel and its rotational speed. The maximum amount of energy which can be stored is limited by the materials of construction and the manner in which the stresses which are created are distributed within the flywheel. Metals, which have traditionally been used for the manufacture of flywheels, are not particularly suitable for flywheels which are required to store relatively large amounts of energy in a relatively small space. The mass of a metal flywheel and the necessary containment for the flywheel could negate the advantage of using such an energy storage system in a vehicle. Preferably therefore the material of construction for a compact, high speed flywheel has a lower density than metal but is at least as strong. Suitable materials are fibre composite materials i.e. matrix materials such as epoxy or polyester resins which are reinforced by, for example, carbon fibres, glass fibres or aramid fibres.

Various designs for fibre composite flywheels have been proposed. However, the use of such flywheels presents certain difficulties particularly when the fibre composite flywheel is mounted on a relatively stiff shaft passing through a hole in a hub at the centre of the flywheel. The term "relatively stiff shaft" as used in this specification means a shaft which has a greater radial stiffness than the hub of the flywheel. Suitable materials of construction for such relatively stiff shafts include metals and carbon fibre composite materials. Fibre composite flywheels have a relatively low density and are required to operate at very high rotational speeds in order to obtain high energy densities. The centrifugal forces acting on a fibre composite flywheel rotating at high speed result in a certain amount of growth in the radial direction. Tensile stresses are generated in the hub of the flywheel which tend to cause the diameter of the hole in the hub to increase. There is little radial growth of a relatively stiff shaft such as a metal or carbon fibre shaft when it is rotated at high speed. Thus, the hub of the flywheel can separate from the shaft in some cases.

The applicants have invented a method of mounting a fibre composite flywheel on a relatively stiff shaft such as a metal or carbon fibre shaft which method overcomes or at least mitigates the problem of the flywheel separating from the shaft at relatively high rotational speeds.

Thus according to the present invention a method of mounting a fibre composite flywheel on a relatively stiff shaft which method comprises passing the shaft through a hole in a hub at the centre of the flywheel and securing the flywheel to the shaft is characterised in that the shaft has a tapered portion and in that a deformable sleeve is positioned between the shaft and the hub of the flywheel on assembly, the deformable sleeve comprising a hollow cylinder having a tapered bore corresponding to the tapered portion of the shaft and having an outside diameter which before deformation is larger than the diameter of the hole in the hub of the flywheel by an amount which is greater than the theoretical amount of radial growth which the hole in the hub would experience at the maximum operating speed of the flywheel, the deformable sleeve is deformed such that it will fit in the hole in the hub of the flywheel and the deformable sleeve is driven along the tapered portion of the shaft thereby forcing the deformable sleeve towards its undeformed shape and subjecting the hub of the flywheel to compressive forces.

The theoretical amount of radial growth which the hole in the hub would experience at the maximum operating speed of the flywheel is determined by theoretical calculations, e.g. finite element analysis, which calculations assume that the flywheel is rotated in the absence of a shaft. The maximum operating speed is the maximum speed at which the flywheel will be rotated in use.

The method according to the present invention subjects the hub of the flywheel to compressive stresses. Since the outside diameter of the deformable sleeve before deformation is larger than the theoretical amount of radial growth which the hole in the hub would experience at the maximum operating speed of the flywheel, the net stresses in the hub are compressive throughout the range of operating speeds. Thus the hub of the flywheel remains in contact with the deformable sleeve even when the flywheel is rotating at its maximum operating speed.

The deformable sleeve comprises a hollow cylinder which, before deformation, has an outside diameter which is larger than the diameter of the hole in the hub of the flywheel. Preferably, the deformable sleeve has an outside diameter which is larger than the diameter of the hole in the hub of the flywheel by at least twice the theoretical amount of radial growth which the hole in the hub would experience at the maximum operating speed. Thus, for a fibre composite flywheel in which the hub is expected to experience a strain of +0.2% at the maximum operating speed, i.e. the theoretical amount of growth in the radius of the hole in the hub is 0.002 mm per mm of the radius of the hole, the outside diameter of the deformable sleeve before deformation, is preferably at least 0.4% larger than the diameter of the hole in the hub, as measured before assembly. The maximum amount by which the outside diameter of the deformable sleeve exceeds the diameter of the hole in the hub of the flywheel depends, inter alia, on the overall dimensions of the components and the materials of construction. Typically, the outside diameter of the deformable sleeve is not more than four times the theoretical amount of radial growth which the hole in the hub would experience at the maximum operating speed.

The deformable sleeve must be deformed such that it will fit in the hole in the hub of the flywheel. A suitable means for providing for the deformation comprises one or more axial slots in the sleeve. The size of the sleeve, the material of construction and the amount of deformation required are taken into account in selecting the number and size of the slots. Preferably, the deformable sleeve has at least one pair of diametrically opposed axial slots.

The deformable sleeve is preferably made of a material having physical properties between those of the fibre composite material and the material of the shaft. It is particularly useful for the sleeve to have a coefficient of thermal expansion and a stiffness between those of the flywheel and shaft. Suitable materials of construction for the sleeve include, nylon, PTFE, fibre reinforced composites and metals. The preferred material of construction for the sleeve are aluminium and aluminium alloys.

Figure 2:
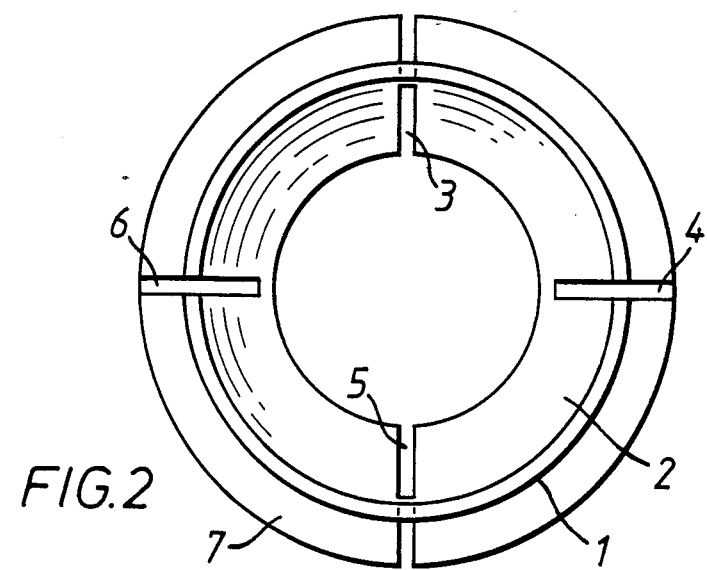

A deformable sleeve suitable for use in the present invention is illustrated in FIGS. 1 and 2 in which FIG. 1 is a side elevation of the deformable sleeve and FIG. 2 is an end view of the deformable sleeve of FIG. 1.

The deformable sleeve illustrated in FIGS. 1 and 2 comprises a hollow cylinder 1, having a tapered bore 2. The deformable sleeve has a flange 7 at the end of the cylinder 1 having the narrow end of the tapered bore 2. Four axial slots 3,4,5 and 6 are equally spaced around the cylinder 1. Diametrically opposed slots 3 and 5 start at the edge of the flange 7 and terminate just short of the opposite end of the cylinder 1. Diametrically opposed slots 4 and 6 run in the opposite direction i.e. they start at the end of the cylinder having the wide end of the tapered bore 2 and terminate at the flange 7. The slots 3,4,5 and 6 extend through the walls of the hollow cylinder 1 so that each pair of slots 3 and 5 and 4 and 6 almost divides the cylinder in half axially. The slots 3,4,5 and 6 allow the cylinder to be radially deformed.

Preferably, the outer diameter of the tube 1 is selected to be equal to the diameter of the hole in the hub after assembly. The tapered bore 2 is preferably selected to have the same angle and diameters as the shaft when it is in the correct position on the tapered portion of the shaft.

Preferably a collar is positioned between the deformable sleeve and the hub of the flywheel. The collar comprises a cylindrical tube or coil which after assembly bridges the slots 3,4,5 and 6 in the deformable sleeve so that a relatively smooth surface is acting on the hub of the fibre composite flywheel.

The dimensions and materials of construction of the collar are selected so that the collar is radially expandable on assembly. The collar must be capable of transferring the compressive forces from the deformable sleeve to the hub of the flywheel. The cylindrical collar is preferably relatively thin-walled and has before assembly, an outside diameter which provides a close fit with the hole in the hub of the flywheel.

Suitable materials of construction for the collar include aluminium, copper and brass.

The use of a collar reduces the diameter of the hole in the hub of the flywheel and this must be taken into account in selecting the dimensions of the deformable sleeve.

One method of mounting a fibre composite flywheel on a relatively stiff shaft according to the present invention comprises inserting the collar into the hole in the hub of the flywheel, deforming the deformable sleeve in order to reduce its radial dimension and inserting the deformable sleeve into the hole in the collar and then driving the flywheel, collar and deformable sleeve along the tapered portion of the shaft. A flange 7 such as that shown in FIGS. 1 and 2 engages the collar and flywheel enabling all three components to be driven along the shaft together.

An alternative method of mounting a fibre composite flywheel on relatively stiff shaft according to the present invention comprises inserting the collar into the hole in the hub of the flywheel, positioning the flywheel and collar at the required position along the tapered portion of the shaft and then deforming the deformable sleeve such that it will fit into the hole in the collar and driving the deformable sleeve along the tapered portion of the shaft to the required position between the shaft and the collar.

As the deformable sleeve is driven along the tapered portion of the shaft, the deformed sleeve is forced towards its original undeformed shape, and its radial dimension increases. This causes the collar to expand thereby inducing the compressive forces in the hub of the flywheel.

Once at the required position on the tapered portion of the shaft, the sleeve is secured to the shaft by suitable means such as, for example, by clamping using retaining means.

We claim:

1. A method of mounting a fibre composite flywheel on a relatively stiff shaft comprising providing (A) a flywheel having a hole in the hub at the centre of the flywheel; (B) a shaft having a tapered portion and (C) a deformable sleeve comprising a hollow cylinder having a tapered bore which corresponds to the tapered portion of the shaft and having an outside diameter which before deformation is larger than the diameter of the hole in the hub of the flywheel by an amount which is greater than the theoretical amount of radial growth which the hole in the hub would experience at the maximum operating speed of the flywheel, the deformable sleeve having at least one pair of diametrically opposed slots which allow radial deformation of the deformable sleeve, the method further comprising positioning the flywheel on the shaft with the deformable sleeve between the shaft and the hub by deforming the deformable sleeve by compressing it so it will fit the hole in the hub of the flywheel and driving the deformable sleeve along the tapered portion of the shaft thereby forcing the deformable sleeve towards its undeformed shape and subjecting the hub of the flywheel to compressive forces.

2. A method as claimed in claim 1 in which the deformable sleeve has an outside diameter before deformation, which is larger than the hole in the hub of the flywheel by an amount which is from 2 to 4 times the theoretical amount of radial growth which the hole in the hub would experience at the maximum operating speed of the flywheel.

3. A method as claimed in claim 1 in which a collar is positioned between the deformable sleeve and the hub of the flywheel.

4. A method as claimed in claim 3 in which the collar is inserted into the hole in the hub of the flywheel, the deformable sleeve is deformed and inserted into the hole in the collar and then the flywheel, collar and deformable sleeve are driven together along the tapered portion of the shaft.

5. A method as claimed in claim 3 in which the collar is inserted into the hole in the hub of the flywheel, the flywheel and collar are positioned at the required position along the tapered portion of the shaft, the deformable sleeve is then deformed such that it will fit into the hole in the collar and driven along the tapered portion of the shaft to the required position between the shaft and the collar.

* * * * *